United States Patent [19]

Hikita et al.

[11] Patent Number: 4,792,939
[45] Date of Patent: Dec. 20, 1988

[54] DUPLEX RADIO COMMUNICATION TRANSCEIVER

[75] Inventors: Mitsutaka Hikita, Hachiouji; Atsushi Sumioka, Kokubunji; Yoshikatu Ishida, Ibaragi; Kunihiro Hamada, Koganei; Yutaka Chiba; Yoshio Abe, both of Katsuta, all of Japan

[73] Assignees: Hitachi Denshi Kabushiki Kaisha; Hitachi Ltd., both Tokyo, Japan

[21] Appl. No.: 6,171

[22] Filed: Jan. 23, 1987

[30] Foreign Application Priority Data

Jan. 24, 1986 [JP] Japan .................................. 61-12122
Jan. 30, 1986 [JP] Japan .................................. 61-16711

[51] Int. Cl.4 ............................................. H04B 1/56
[52] U.S. Cl. ......................................... 370/24; 455/86
[58] Field of Search ..................... 455/76, 86; 370/24, 370/25, 26, 32, 32.1, 30, 38

[56] References Cited

U.S. PATENT DOCUMENTS 3,728,731 4/1973 Choi et al. ........................... 343/180
4,509,165 4/1985 Tamura ................................. 370/30
4,575,698 3/1986 Schofield ............................ 333/195

Primary Examiner—Benedict V. Safourek
Assistant Examiner—Stephen Chin
Attorney, Agent, or Firm—Antonelli, Terry & Wands

[57] ABSTRACT

In order to reduce the size of a duplex radio communication transceiver such as a mobile telephone, this transceiver is constructed of a transmitting and receiving duplexer, a filter to be coupled to the duplexer, an amplifier for amplifying a signal received, and a filter to be connected with the output of the amplifier. All the filters are made of acoustic surface wave filters, and all the circuits are mounted on a single metallic substrate and sealed by means of a metallic casing into a module. The transceiver thus constructed has a volume which is one tenth as small as that of the device of the same kind according to the prior art.

12 Claims, 5 Drawing Sheets

DUPLEX RADIO COMMUNICATION TRANSCEIVER

BACKGROUND OF THE INVENTION

1. Field of the Invention

The present invention relates to a duplex radio communication transceiver and, more particarly, to a structure of parts to be used in a transceiver for duplex radio communications such as a mobile telephone, which structure is intended to reduce the size of a high-frequency part including a duplexer for coupling an antenna, a transmitting part and a receiving part.

2. Description of the Prior Art

In order to facilitate the handling and portage of a transceiver for duplex radio communications such as a mobile transceiver, it is remarkably important to make the entire transceiver small-sized and handy.

The transceiver described above is composed essentially of an antenna for transmitting and receiving radio waves of multiple frequencies, a duplexer for coupling the antenna and the transmitting and receiving parts of the transceiver, a receiving high-frequency part for converting the received signal of the duplexer into a signal of lower frequency, and a transmitting high-frequency part for increasing the frequency of and controlling the power of a signal to be transmitted and for coupling it to the duplexer.

Prior art duplexers have a problem of a large volume because they use a filter in which several cavity resonators containing ceramics or the like having a high relative dielectric constant are incorporated in a tandem connection (for example, four or five for the transmitting filter elements and five or six for the receiving filter elements).

Since, moreover, the cavity resonators used in prior art duplexers have large volumes, a receiving low-noise amplifier and a receiving second filter composed of the cavity resonators like the above-mentioned (e.g., three cavity resonators in tandem connection) are fabricated as separate circuit elements, which are connected on the mother board of the transceiver.

This makes it difficult to reduce the size of the transceiver because of the large volumes of the individual circuit elements and the large dead spaces for their connections.

As a result, it is a serious concern for portable telephones or the like having an earnest demand for size reduction to reduce the size of the duplexers including the low-noise amplifier and the receiving second filter.

On the other hand, the transmitting high-frequency part is composed of a power amplifier for amplifying the low power (of 0.1 to 1 mW) of a high-frequency signal (of several tens MHz to several GHz) into a high power (of several W), and a driver amplifier for coupling the output of the power amplifier in an optimum state to the duplexer. Since the transceiver according to the prior art is manufactured such that those amplifiers are separately made into a module and arranged, the volumes occupied by the amplifiers are increased to raise a problem of making it difficult to reduce the size of the transceiver.

In order to solve this problem, it is conceivable to form the driver amplifier and the power amplifier on a common heat-sink substrate or metallic substrate to make a single module. In this case, however, it is substantially impossible to check up the matching condition of the inside of the module using five or six bipolar transistors or FETs. As a result, the transceiver of the prior art is accompanied by a defect that its control takes a very long time so that its mass-productivity is deteriorated.

SUMMARY OF THE INVENTION

It is, therefore, a major object of the present invention to reduce the size of a duplex radio communication transceiver.

A specific object of the present invention is to provide a small-sized duplexer module which can reduce both the entire size of a duplexer including a branching circuit, a transmitting filter, a receiving first filter, a receiving second filter and a low-noise amplifier and the dead spaces so that it can be applied to a small-sized mobile telephone.

Another object of the present invention is to provide a power amplifier module which can integrate a band-pass filter, a driver amplifier and a power amplifier into a module and can have its control facilitated and its mass-productivity improved by reducing the size of a part used in the duplex radio communication transceiver for amplifying the power of the transmitted signal.

In order to achieve the above-specified objects, in the duplex radio communication transceiver of the present invention, the duplexer including the receiving low-noise amplifier and the receiving second amplifier is made in its entirety into one module by using acoustic surface wave filters as the transmitting and receiving filters and by integrating at least the transmitting and receiving first and receiving second acoustic surface wave filters, the receiving low-noise amplifier, input/output terminals and an antenna terminal on a common metallic substrate.

Since the acoustic surface wave filters are used as the transmitting and receiving filters, according to this structure, the size of the filter itself can be reduced to about one several tenth of that of the filter using the cavity resonators according to the prior art. Since, moreover, those acoustic surface wave filters are integrated with the receiving low-noise amplifier and the branching circuit on the common metallic substrate, the dead spaces can become small-sized so that the entire size of the duplexer can be drastically reduced from the size according to the prior art.

In a preferred mode of embodiment of the present invention, a power amplifier part for amplifying a signal to be transmitted to the aforementioned duplexer is integrated by arranging the driver amplifier having an input matching circuit of the acoustic surface wave filters, the acoustic surface wave filters, and the power amplifier having an output matching circuit of the acoustic surface wave filters on a common heat-sink substrate such that the acoustic surface wave filters are interposed between the two amplifiers.

According to the above-specified embodiment, the entire structure can be made drastically small-sized by arranging and integrating the remarkably small acoustic surface wave filters between the power amplifier and the driver amplifier. Moreover, the driver amplifier and the power amplifier are respectively equipped with a built-in matching circuit for the acoustic surface wave filters so that they can be checked up and controlled independently of each other after they are mounted on the heat sink substrate. This structure ensures a mass-productivity similar to that of the prior art, in which the driver amplifier and the power amplifier are made into separate modules.

The above-mentioned and other features and objects of the present invention will become more apparent by reference to the following description taken in conjunction with the accompanying drawings.

DESCRIPTION OF THE PREFERRED EMBODIMENTS

For convenience of description, the structure of the transceiver of a mobile telephone, i.e., one of the duplex radio communication transceiver to be embodied by the present invention will be described with reference to FIG. 1.

Figure 1:
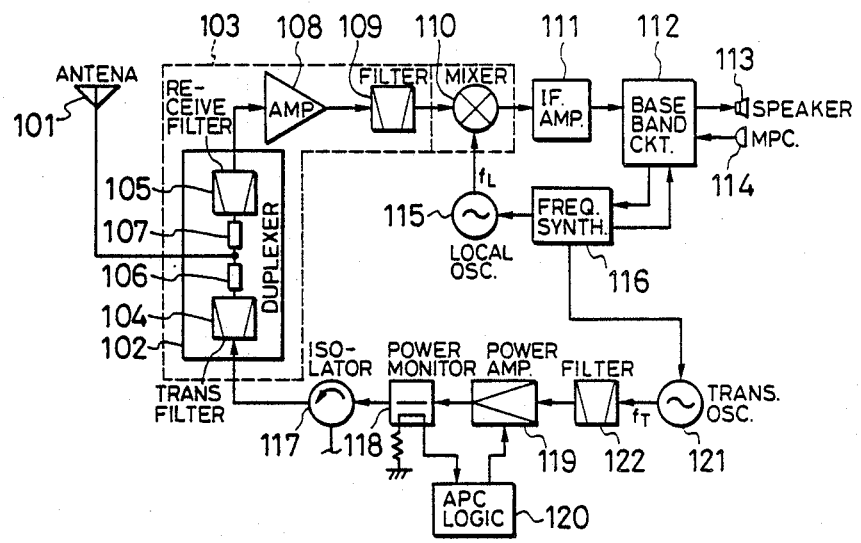
FIG. 1 is a block diagram showing the known structure of a transceiver of a mobile telephone to be embodied by the present invention.

In FIG. 1: reference numeral 101 denotes an antenna; numeral 104 a transmitting filter; numeral 105 a receiving first filter; numeral 106 a transmission side line of a branching circuit; numeral 107 a reception side line of the branching circuit; numeral 108 a receiving low-noise amplifier; numeral 109 a receiving second filter; numeral 110 a receiving mixture; numeral 111 a receiving IF amplifier and demodulator; numeral 112 a base band circuit; numeral 113 a receiving speaker; numeral 114 a transmitting microphone; numeral 115 a voltage-controlled oscillator for local oscillation; numeral 116 a synthesizer logic circuit; numeral 117 an isolator; numeral 118 a coupler circuit for automatic transmission power control; numeral 119 a power amplifier; numeral 120 a logic circuit for automatic transmission power control; numeral 121 a voltage-controlled oscillator for transmission; and numeral 122 a band-pass filter.

The description of the constructions and operations of the above-recited parts is omitted because it is well known in the prior art. In the duplex radio communication transceiver thus structured, a duplexer 102 for transmitting a fine signal to a receiver by using a difference in frequencies and a high-power signal to the antenna plays an important role so that the single antenna may be used commonly for the transmission and reception.

According to the present invention, a portion enclosed by broken lines in FIG. 1 is made into a module.

Figure 2:
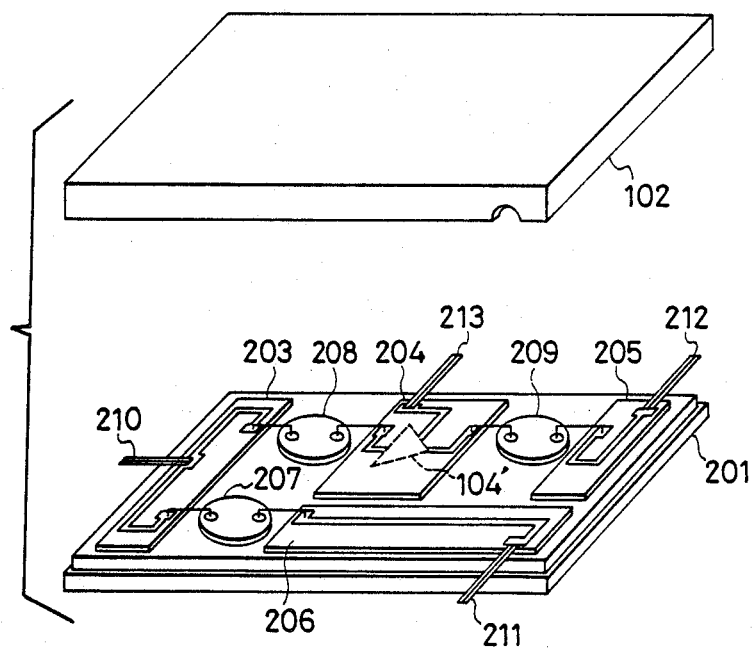
FIG. 2 is an exploded perspective view showing one embodiment of an acoustic surface wave duplexer module to be used in the duplex radio communication transceiver according to the present invention.

FIG. 2 is an exploded perspective view showing one embodiment of this module.

In FIG. 2, a metallic substrate 201 for mounting the individual elements is made of an aluminum plate of 3.5 cm×2.5 cm, for example.

Moreover, a transmitting acoustic surface wave filter 207, a receiving first acoustic surface wave filter 208 and a receiving second acoustic surface wave filter 209 are packages having a diameter of about 8 mm, which are so mounted in holes formed in the metallic substrate as have their terminals directed upward.

These acoustic surface wave filters to be used can be those known in the art (as disclosed in "Low Loss SAW Filter for Antenna Duplexer" by M. Hikita, 1983 IEEE Ultrasonic Symposium Proc., pp. 77 to 82).

On the other hand, the branching circuit is formed of a microwave strip line on an insulating alumina substrate and has its corresponding terminals soldered to the output terminal of the transmitting acoustic surface wave filter 207 and to the input terminal of the receiving first acoustic surface wave filter 208 and its antenna terminal 210 led out.

A receiving low-noise amplifier 104' is formed of a hybrid circuit on an alumina substrate and has its corresponding terminals soldered to the output terminal of the receiving first acoustic surface wave filter and the input terminal of the receiving second acoustic surface wave filter.

Incidentally, reference numeral 213 denotes a power terminal for supplying an electric power to the receiving low-noise amplifier.

Upstream of the transmitting acoustic surface filter 207, moreover, there is disposed a transmitting input terminal substrate 206 of alumina, which is connected with a transmitting input terminal 211 through a microwave strip line.

This microwave strip line is a simple LC low-pass filter for attenuating secondary and ternary harmonic waves to be transmitted.

Likewise, a receiving output terminal 212 is disposed downstream of the receiving second acoustic surface wave filter 209 through its alumina substrate 205.

Incidentally, the branching circuit and the receiving low-noise amplifier can be formed on a similar alumina substrate by similar process (e.g., a thick printing process).

In the duplexer module to be used in the present invention, as described above, the entire structure of the duplexer extending from the receiving low-noise amplifier to the receiving second filter is integrated on one metallic substrate by mounting the branching circuit, the receiving low-noise amplifier, the transmitting input terminal circuit and the receiving output terminal circuit, which are formed on the alumina substrates, on the metallic substrate 201 of a metallic plate such as the aluminum plate, by mounting the three packaged acoustic wave filters 207, 208 and 209 on the metallic substrate 201, and by fixing the individual terminals to the corresponding terminals of the circuit substrate.

As a result, the filters themselves can be small-sized because they are the acoustic surface wave filters, and the dead spaces, which might otherwise come from the module mounting, can be reduced to a negligible extent. Thus, the entire structure of the module can be made far smaller than that of the prior art, in which the individual parts are mounted on the mother board, to highly contribute to the reduction in the entire size of the transceiver.

Next, another embodiment of the present invention will be described in the following.

Generally speaking, the acoustic surface wave filter has to be equipped externally with a matching circuit for eliminating the static capacity intrinsic to a transducer for exciting acoustic surface waves between electrodes.

In the high-frequency acoustic surface wave filter of about 800 MHz to be used in the mobile telephone to which the present invention is applied, that matching circuit is frequently made of a relatively simple circuit such as a short stab or a combination of the short stab and a line.

In the structure, however, in which the duplexer, the low-noise amplifier and the receiving second filter are combined independently of one another on the mother board of the transceiver, as in the combination of the prior art, the aforementioned matching circuit has to be formed on the mother board. In the portable telephone required especially to be small-sized, the capacity occupied by the matching circuit cannot be neglected, and the effect of the reduction in the capacity is weakened even if the small-sized acoustic surface wave filter is used with much effort.

Figure 3A:
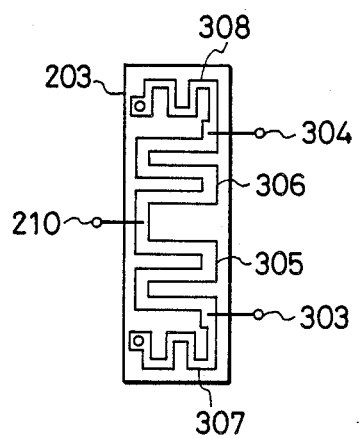
FIG. 3A is a top plan view showing one embodiment of the duplexer to be incorporated into the acoustic surface wave duplexer module.
Figure 3B:
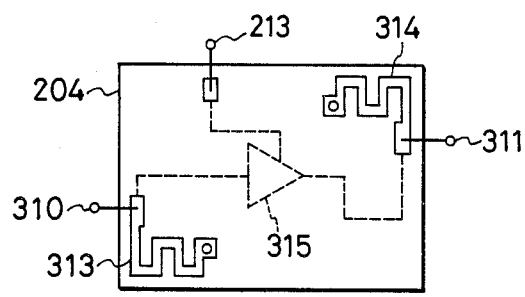
FIG. 3B is a top plan view showing one embodiment of the receiving amplifier to be incorporated into the acoustic surface wave duplexer module.

In case the circuit substrate such as the branching circuit and the low-noise amplifier is contained in the duplexer module as in the present invention, the matching circuit can be formed on the circuit substrate, as shown in FIGS. 3A and 3B.

First of all, as shown in FIG. 3A, an output matching circuit 307 for the transmitting acoustic surface wave filter 207 and an input matching circuit 308 for the receiving first acoustic surface wave filter 208 are formed on the substrate 203 for the branching circuit.

Incidentally, reference numeral 305 denotes a transmission side line for the branching circuit, numeral 306 a reception side line for the branching circuit, numeral 303 a terminal to be connected with the output terminal of the transmitting acoustic surface wave filter 207, and numeral 304 a terminal to be connected with the input terminal of the receiving first acoustic surface wave filter 208.

Next, as shown in FIG. 3B, an output matching circuit 313 for the receiving first acoustic surface wave filter 208 and an input matching circuit 314 for the receiving second acoustic surface wave filter 209 are formed on the receiving low-noise amplifier substrate 204.

Incidentally, reference numeral 315 denotes a receiving low-noise amplifier, numeral 310 a terminal to be connected with the output terminal of the receiving first acoustic surface wave filter 208, and numeral 311 a terminal to be connected with the input terminal of the receiving second acoustic surface wave filter 209.

The entire structure of the module can be made further small-sized by simultaneously forming the matching circuits of the acoustic surface wave filters on the branching circuit substrate and the receiving low-noise amplifier substrate, as has been described above.

A further size reduction can be effected by making common the output matching circuit of the receiving first acoustic surface wave filter, the input matching circuit of the receiving second acoustic surface wave filter, and the matching circuit of the receiving low-noise amplifier.

Next, the embodiment thus far described is directed to the module in which the transmitting filter, the branching circuit, the receiving first filter, the receiving low-noise filter and the receiving second filter are integrated. If, however, a circuit substrate similar to those of the branching circuit and the receiving low-noise filter is used so that the parts to be formed by a similar process are incorporated into the module, contribution to the reduction in the size of the entire structure of the transceiver can be enhanced.

In FIG. 1, for example, the mixer 110 connected with the downstream of the receiving second filter 109 can be constructed of a hybrid circuit using the alumina substrate like the branching circuit and so on. As a result, the entire structure of the transceiver can be made smaller by integrating the mixer 110, too, in the duplexer module.

This similarly applies to the transmission side.

Generally speaking, in a transceiver called the "cellular radio" such as the mobile telephone (or the portable telephone), the transmission power level has to be switched several steps in response to the command of the base station.

This is called the APC (i.e., Automatic Power Control), and a check-up circuit for this power control extracts a portion of the transmission power through the coupler 118 and transmits it to the power control logic circuit 120 either directly or after detection.

This check-up circuit is also generally formed of an alumina substrate and a microwave strip like the branching circuit and can be integrated in the duplexer module.

Figure 4A:
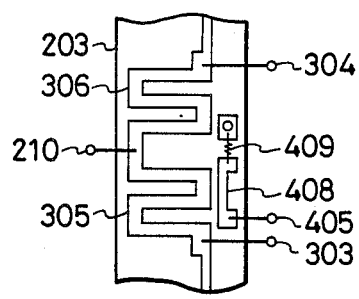
FIGS. 4A and 4B are top plan views showing portions of other embodiments of the duplexer.
Figure 4B:
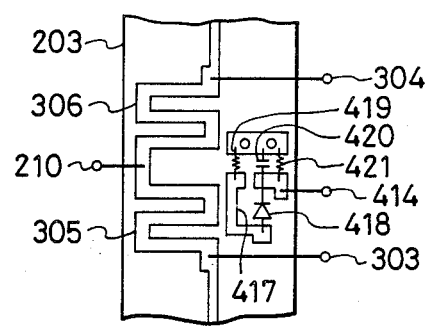

FIGS. 4A and 4B show another embodiment in which the aforementioned check-up circuit is formed on the branching circuit substrate 203 and integrated in the duplexer module.

First of all, as shown in FIG. 4A, a coupling line 408 for electromagnetic coupling is disposed in the vicinity of the transmission side line 305 of the branching circuit on the substrate 103 to extract a portion of the transmission power from a check-up terminal 405 to the outside of the module. Incidentally, reference numeral 409 denotes a terminal resistor.

Next, as shown in FIG. 4B, a detecting diode 418 is provided in addition to a coupling line 417 so that the detected output, i.e., a DC level signal is transmitted to the outside of the module.

Incidentally, reference numeral 414 denotes a check-up terminal, numeral 419 a terminal resistor, numeral 420 a capacitor, and numeral 421 a resistor.

Other than the aforementioned combination, there can be conceived a variety of methods regarding the coupling method, the coupling place and the extracting method. In any way, the entire structure of the transceiver can be made smaller by mounting the automatic power control check-up circuit and its output terminal in the duplexer module.

Incidentally, in the description thus far described, the low-noise amplifier, the mixer and so on are exemplified by the hybrid circuits. However, the present invention can also be applied to the case of the monolithic amplifier and mixer which have their circuits are made monolithic.

Moreover, the acoustic surface wave filters are handled as are mounted in the package. However, they can naturally be mounted as chips in case the acoustic surface wave filters can be made into chips.

Figure 5:
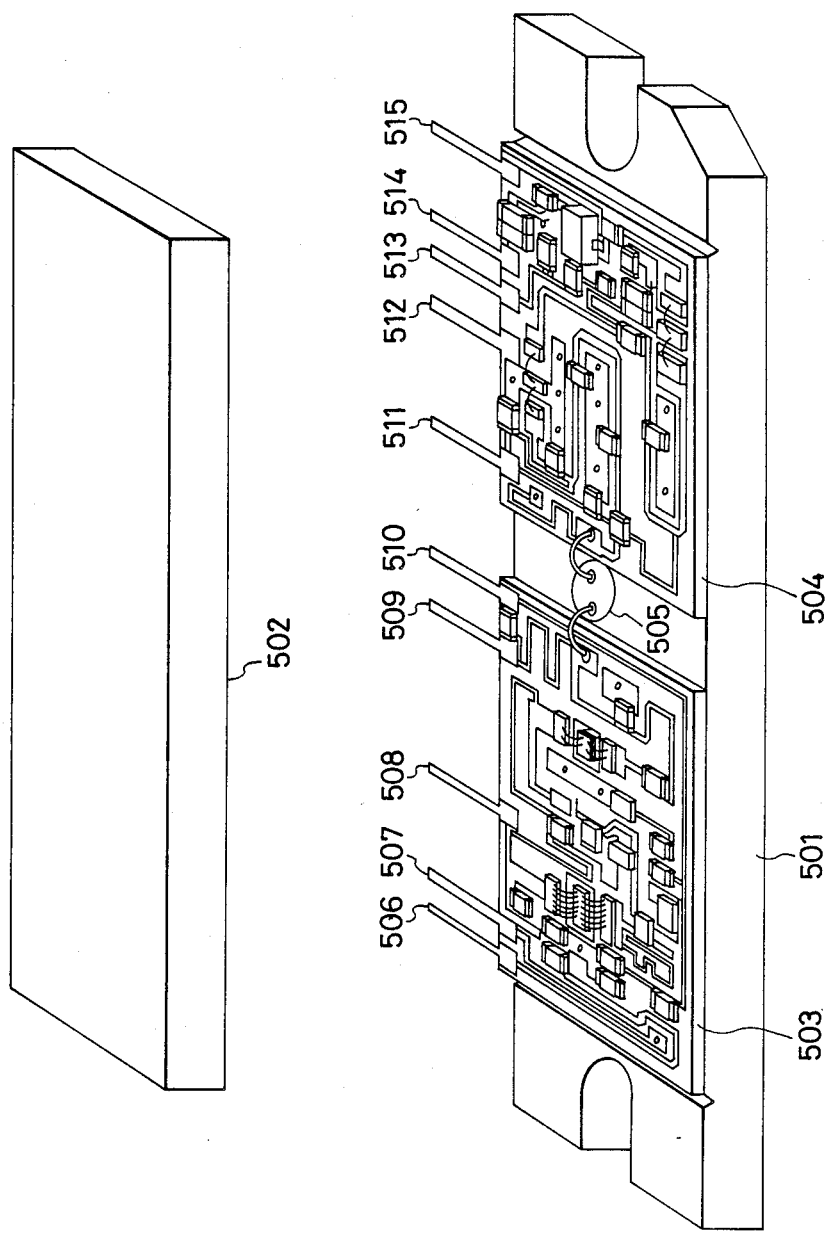
FIG. 5 is an exploded perspective view showing one embodiment of a transmitted signal power amplifying part module to be used in the duplex radio communication transceiver according to the present invention.
Figure 6:
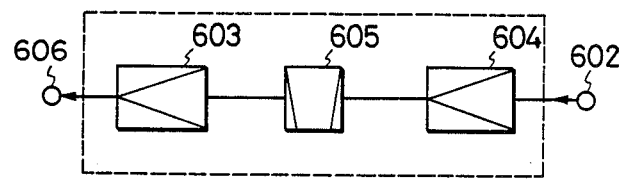
FIG. 6 is a block diagram showing the structure of the transmitted signal power amplifying part of FIG. 5.

FIG. 5 is an exploded perspective view showing one embodiment of the power amplifier module of the transmitting power amplifying part (119 and 122) of FIG. 1. In this embodiment, a power amplifier 603, an acoustic surface wave filter 605 and a driving amplifier 604 are connected in series, as shown in FIG. 6, so that they may be formed into a module or so that the driving amplifier may be checked up or controlled independently of each other in the course of fabrication of the power amplifier module. An output terminal 606 and an input terminal 602 are connected with the duplexer and the oscillator 121 of FIG. 1, respectively.

In FIG. 5, a power amplifying part 503 and a driving amplifier part 504 are mounted on a heat sink substrate 501, and an acoustic surface wave filter 505 is interposed therebetween.

Moreover, reference numeral 502 denotes a cover, numeral 506 the output terminal of the power amplifier, numeral 507 a power terminal, numeral 515 the input terminal of the driving amplifier part, numeral 514 a power terminal, and numerals 508 and 513 controlling input and output terminals.

The aforementioned heat sink substrate 501 is made of a copper plate having an excellent heat conduction, for example.

The values of a broad-band power amplifier for a portable telephone of 800 MHz will be exemplified in the following.

The driving amplifier uses one bipolar transistor and two FETs to amplify a low power of about 0.1 mW to about 200 mW. On the other hand, the power amplifier uses two FETs to amplify a power of about 50 mW (wherein the loss of the pass band in the acoustic surface wave filter is about 3 to 5 dB) to about 4W. In this case, the power amplifying part 503 has a size of 2.6 cm×1.5 cm, and the driving amplifier 504 has a size of 2.8 cm×1.5 cm. Moreover, the acoustic surface wave filter 505 is mounted in a package having a diameter of about 5 mm. These parts can be integrated on a heat sink substrate having a size of 6 cm×1.5 cm.

Incidentally, the acoustic surface wave filter 505 is fixed by forming such a round hole in the heat sink substrate 501 as can receive the package of the acoustic surface wave filter, by mounting the package in the hole with its terminals directed upward, and by either soldering the heat sink substrate 501 and the package or fixing them by means of a special holding fixture.

Next, a method for controlling the above-mentioned power amplifier shown in FIG. 5 is explained.

In the present embodiment, the power amplifying part 503 and the driving amplifier part 504 are first mounted on the heat sink substrate 501. At this stage, they are controlled (to change the position and capacity of the chip capacitor or the like) independently of each other to confirm the electric performances. After this, the acoustic surface wave filter 505 is mounted on and connected to the heat sink substrate 501.

Figure 7:
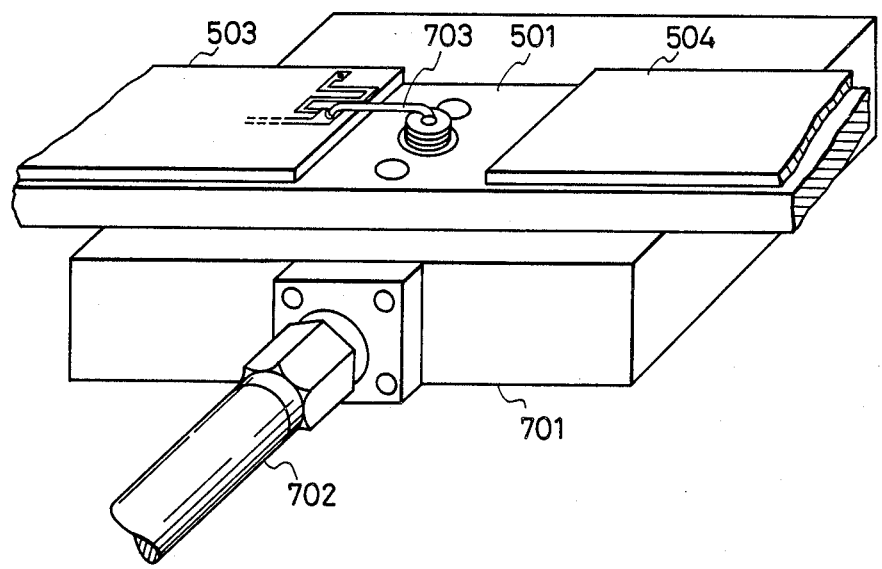
FIG. 7 is a perspective view showing a control for controlling the module of the transmitted signal power amplifying part shown in FIG. 5.

The use of a special jig shown in FIG. 7 is convenient for controlling the aforementioned individual amplifying parts.

As shown in FIG. 7, the individual amplifiers can be checked up and controlled by fixing the heat sink substrate 501 on a controlling special jig 701, by projecting a measuring coaxial line 702 from the surface through the acoustic surface wave filter mounting hole, by connecting a core 703 alternately at predetermined positions with the power amplifying part 503 and the driving amplifier part 504.

Since the individual amplifiers can be checked and controlled individually of each other in the course of the fabrication of the module, as described above, it is possible to retain a mass-productivity similar to that of the prior art in which the driving amplifier and the power amplifier are formed into separate modules.

Next, the matching circuit for the acoustic surface wave filter 505 will be described in the following.

Generally speaking, the acoustic surface wave filter has to be equipped externally with a matching circuit for eliminating the inter-electrode static capacity, which is intrinsic to a transducer for exciting the acoustic surface waves.

In the high-frequency acoustic surface wave filter of about 800 MHz, the aforementioned matching circuit is frequently formed of a relatively simple circuit such as a short stab circuit or a combination of the short stab and a line.

In case, however, the acoustic surface wave filter is disposed as the band-pass filter upstream of the driving amplifier, it is generally necessary to form a matching circuit, as described above, on the mother board. The capacity occupied by the matching circuit is not negligible especially for the portable telephone which is earnestly required to be small-sized.

In case the acoustic surface wave filters are integrated with the driving amplifier and the power amplifier and formed on the common heat sink substrate, as in the present invention, the input matching circuit of the acoustic surface wave filter and the output matching circuit of the acoustic surface wave filter can be formed in the driving amplifier part and the power amplifying part, respectively, and together with other respective matching circuits so that the size can be drastically reduced.

Figure 8:
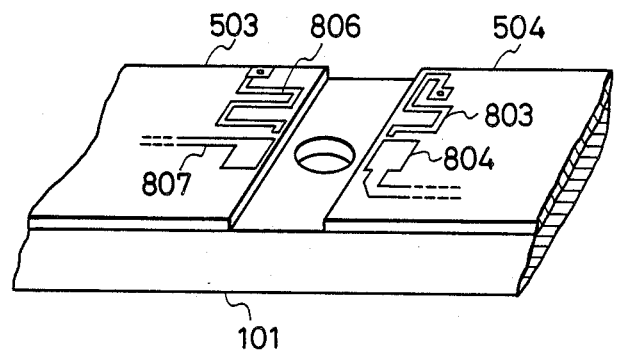
FIG. 8 is a perspective view showing one embodiment of a matching circuit to be incorporated into the transmitted signal power amplifying part.

In this case, as shown in FIG. 8, it is recommended to form the output terminal 804 of the driving amplifier part 504 and the input terminal 807 of the power amplifying part 503 on the circuit pattern of each amplifier independently of matching circuits 803 and 806 of the acoustic surface wave filters and to solder them when the acoustic surface wave filters are to be mounted.

For a smaller size, it is possible to make common the input matching circuit of the acoustic surface wave filter and the output matching circuit of the driving amplifier part, and the output matching circuit of the acoustic surface wave filter and the input matching circuit of the power amplifier part.

Likewise, this sharing holds for the power supply bias circuit, and it is possible to make common the input matching circuit of the acoustic surface wave filter and the output bias circuit of the driving amplifier part, and the output matching circuit of the acoustic surface wave filter and the input bias circuit of the power amplifying part.

Next, the following is directed to a point in which the mounting fixture for mounting the acoustic surface wave filter on the heat sink substrate is used as an electromagnetic shield plate.

Since the bipolar transistors, FETs and so on used in the power amplifier have high gains, generally speaking, they are accompanied by undesirable oscillations and unnecessary emissions if they are connected in tandem.

One means conceivable for suppressing those oscillations and so on is to electromagnetically shield the driving amplifier part and the power amplifying part thereby to reduce the rounding.

Figure 9:
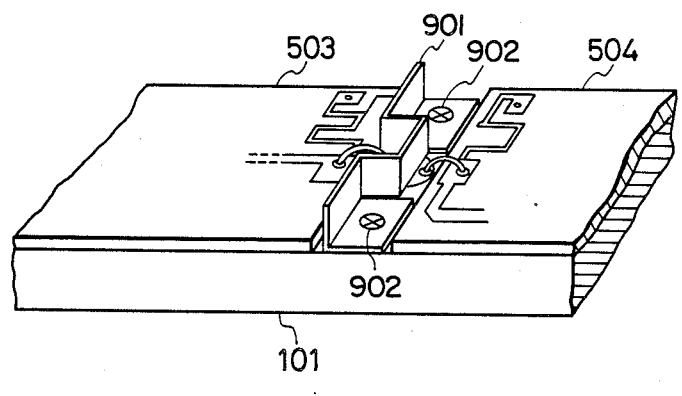
FIG. 9 is a perspective view showing one embodiment of a fixture mounted in the power amplifying unit for holding the acoustic surface wave filter.

In the foregoing embodiment of FIG. 5, the acoustic surface wave filter is soldered directly to the heat sink substrate. In order to suppress the oscillations due to the aforementioned rounding, it is effective, as shown in FIG. 9, to fix the acoustic surface wave filter on the heat sink substrate by means of a holding fixture 901 and to use the fixture 901 as the electromagnetic shield between the driving amplifier part 504 and the power amplifying part 503. Incidentally, reference numeral 902 denotes fastening screws for fastening the holding fixture 901 to the heat sink substrate 501.

Incidentally, the hybrid circuit is presented as an example in the description thus far made. The present invention can also be applied to the case of the monolithic circuit.

On the other hand, the acoustic surface wave filter is mounted in the package but may naturally be mounted in a chip in case the acoustic surface wave filter can be made of the chip as a result of an improvement in the reliability.

What is claimed is:

1. A duplex radio communication transceiver comprising:
    (a) a module including the following parts mounted on a single metallic substrate:
        a branching circuit having an antenna terminal to be coupled to an antenna, a transmission signal input terminal and a reception signal output terminal;
        a transmitting acoustic surface wave filter coupled to said transmission signal input terminal;
        a first acoustic surface wave filter coupled to said reception signal output terminal;
        a receiving amplifier for amplifying the output of said first acoustic surface wave filter; and
        a second acoustic surface wave filter for inputting the output of said receiving amplifier;
    (b) a mixer for mixing the output of said second acoustic surface wave filter and the output of a local oscillator;
    (c) an intermediate amplifier for amplifying the output of said mixer; and
    (d) a transmission signal power amplifying part for amplifying power of a signal to be transmitted to apply it to said transmitting acoustic surface wave filter.

2. A duplex radio communication transceiver according to claim 1,
    wherein said branching circuit is formed on an insulating substrate and of strip lines between said transmission signal input terminal and said antenna terminal and between said antenna terminal and said reception signal output terminal and is connected with an output matching circuit of said transmitting acoustic surface wave filter and an input matching circuit of said first acoustic surface wave filter, and
    wherein said receiving amplifier, an output matching circuit of said first acoustic surface wave filter and an input matching circuit of said second acoustic surface wave filter are formed on an insulating substrate.

3. A duplex radio communication transceiver according to claim 2, further comprising:
    (e) an automatic power control check-up circuit formed on the insulating substrate of said branching circuit and having an output terminal for controlling said transmission signal power amplifying part.

4. A duplex radio communication transceiver according to claim 1,
    wherein said transmission signal power amplifying part includes:
        a single metallic substrate;
        first and second insulating substrates mounted on said metallic substrate;
        a power amplifier mounted on said second insulating substrate;
        a driving amplifier mounted on said first insulating substrate for driving said power amplifier;
        an acoustic surface wave filter mounted on said metallic substrate;
        an output matching circuit for said acoustic surface wave filter mounted on said first insulating substrate and connected between the input terminal of said power amplifier and the output terminal of said acoustic surface wave filter; and
        an input matching circuit for said acoustic surface wave filter mounted on said second insulating substrate and connected between the output terminal of said driving amplifier and the input terminal of said acoustic surface wave filter.

5. A duplex radio communication transceiver according to claim 4,
    wherein said transmission signal power amplifying part further includes a metal plate member for mounting said acoustic surface wave filter on said metallic substrate and for electromagnetically shielding said power amplifier from said driving amplifier.

6. A duplex radio communication transceiver comprising:
    (a) a module including the following parts mounted on a single metallic substrate:
        a branching circuit having an antenna terminal to be coupled to an antenna, a transmission signal input terminal and a reception signal output terminal;
        a transmitting acoustic surface wave filter coupled to said transmission signal input terminal;
        a first acoustic surface wave filter coupled to said reception signal output terminal;
        a receiving amplifier for amplifying the output of said first acoustic surface wave filter;
        a second acoustic surface wave filter for inputting the output of said receiving amplifier; and
        a mixer for mixing the output of said second acoustic surface wave filter and the output of a local oscillator;
    (b) an intermediate amplifier for amplifying the output of said mixer; and
    (c) a transmission signal power amplifying part for amplifying power of a signal to be transmitted to apply it to said transmitting acoustic surface wave filter.

7. A duplex radio communication transceiver according to claim 6,
    wherein said branching circuit is formed on an insulating substrate and of strip lines between said transmission signal input terminal and said antenna terminal and between said antenna terminal and said reception signal output terminal and is connected with an output matching circuit of said transmitting acoustic surface wave filter and an input matching circuit of said first acoustic surface wave filter, and wherein said receiving amplifier, an output matching circuit of said first acoustic surface wave filter and an input matching circuit of said second acoustic surface wave filter are formed on an insulating substrate.

8. A duplex radio communication transceiver according to claim 7, further comprising:
(d) an automatic power control check-up circuit formed on the insulating substrate of said branching circuit and having an output terminal for controlling said transmission signal power amplifying part.

9. A duplex radio communication transceiver according to claim 6,
wherein said transmission signal power amplifying part includes:
a single metallic substrate;
first and second insulating substrates mounted on said metallic substrate;
a power amplifier mounted on said first insulating substrate;
a driving amplifier mounted on said second insulating substrate for driving said power amplifier;
an acoustic surface wave filter mounted on said metallic substrate;
an output matching circuit for said acoustic surface wave filter mounted on said first insulating substrate and connected between the input terminal of said power amplifier and the output terminal of said acoustic surface wave filter; and
an input matching circuit for said acoustic surface wave filter mounted on said second insulating substrate and connected between the output terminal of said driving amplifier and the input terminal of said acoustic surface wave filter.

10. A duplex radio communication transceiver according to claim 9,
wherein said transmission signal power amplifying part further includes a metal plate member for mounting said acoustic surface wave filter on said metallic substrate and for electromagnetically shielding said power amplifier from said driving amplifier.

11. A wireless device module used for a duplex radio communication transceiver comprising:
a single metallic substrate;
a branching circuit mounted on said substrate and having an antenna terminal to be coupled to an antenna, a transmission signal input terminal and a reception signal output terminal;
a transmitting acoustic surface wave filter mounted on said substrate and coupled to said transmission signal input terminal;
a first acoustic surface wave filter mounted on said substrate and coupled to said reception signal output terminal;
a receiving amplifier mounted on said substrate for amplifying the output of said first acoustic surface wave filter; and
a second acoustic surface wave filter mounted on said substrate for inputting the output of said receiving amplifier.

12. A wireless device module according to claim 11, further comprising:
a mixer circuit mounted on said substrate for mixing the output of said second acoustic surface wave filter and the output of a local oscillator.

* * * * *